United States Patent [19]

Palmaer et al.

[11] Patent Number: 5,069,330
[45] Date of Patent: Dec. 3, 1991

[54] SIDE PLATE FOR A PLASTIC SPIRAL CONVEYOR BELT SYSTEM

[76] Inventors: Karl V. Palmaer, 108 Winding Canyon La., Folsom, Calif. 95630; Eric K. Palmaer, 11749 Melones Cir., Gold River, Calif. 95670

[21] Appl. No.: 620,264

[22] Filed: Nov. 30, 1990

[51] Int. Cl.$^5$ .............................................. B65G 13/02
[52] U.S. Cl. ..................................... 198/778; 198/834
[58] Field of Search .............. 198/778, 831, 852, 834

[56] References Cited

U.S. PATENT DOCUMENTS

| | | | |
|---|---|---|---|
| 3,651,924 | 3/1972 | Homeier et al. | 198/831 X |
| 4,741,430 | 5/1988 | Roinestad | 198/778 |
| 4,852,720 | 8/1989 | Roinestad | 198/778 |
| 4,932,925 | 6/1990 | Roinestad et al. | 198/778 X |
| 4,941,566 | 7/1990 | Irwin | 198/778 |

*Primary Examiner*—Joseph E. Valenza
*Assistant Examiner*—Keith L. Dixon
*Attorney, Agent, or Firm*—Thomas M. Freiburger

[57] ABSTRACT

A side plate for a modular plastic conveyor belt for use in a spiral conveyor belt system has one or more generally vertical grooves formed in its outer side, for engagement with protruding structure of cage bars of a spiral conveyor driving cage. At least one of the grooves is positioned on a common center with a countersink bore which receives a plastic rod head of a connecting rod in the modular conveyer belt. In cooperation with the side plate grooves are bumps or protrusions on the cage bars of the driving cage. These may be formed in cage bar caps which are assembled onto the exterior of the cage bars. At least some of the bumps on the cage bars are at any one time engaged in side plate grooves, providing assistance in the driving of the spiral conveyor belt by the driving cage.

4 Claims, 1 Drawing Sheet

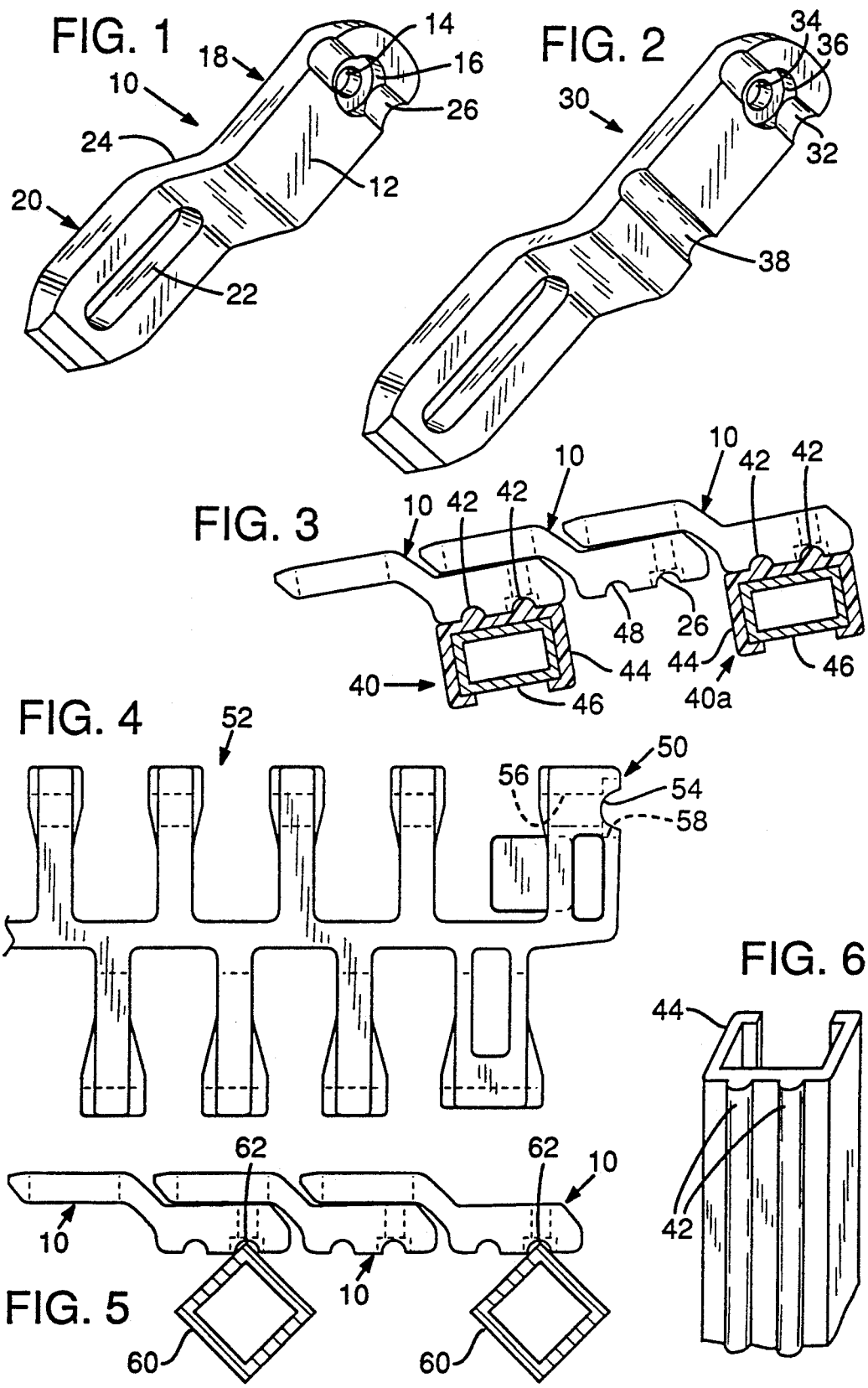

SIDE PLATE FOR A PLASTIC SPIRAL CONVEYOR BELT SYSTEM

BACKGROUND OF THE INVENTION

The invention relates to conveyor belt apparatus, and in particular the invention is concerned with an improvement in side plates of modular plastic conveyor belts as used in a spiral conveyer belt system.

U.S. Pat. No. 4,901,844, commonly owned with the present invention, discloses a spiral, low tension conveyor belt apparatus and system formed of plastic belt modules and having improvements relating to the driving of the belt by a driving cage or driving tower of the system. In that patent, the side plates had recesses or countersink bores for the rod heads of the connecting rods, leaving an essentially smooth surface on the outside of the side plate, for engagement with the driving cage bars. Wear of the rod heads against the cage bars was prevented. The material of the side plate was preferably of a higher friction coefficient than the plastic material forming the remaining portions of the modules. Thus, good frictional engagement was made between the belt and the driving cage, with the side plate surfaces engaging essentially flatly against the cage bars for nearly uniform and smooth driving engagement of the side plates by the bars.

The described system has proven efficient and smooth in function. However, other approaches have been suggested for providing more positive gripping engagement or "position drive" between a driving cage and plastic side plates in a plastic spiral conveyor belt system, particularly for high speed spiral conveyors. See Irwin U.S. Pat. No. 4,941,566, Roinestad U.S. Pat. No. 4,741,430 and Roinestad U.S. Pat. No. 4,852,720. The Irwin patent describes jackets or caps for the cage bars of a driving cage, which are rectangular in cross section. These caps provide grooves at the outer side of each driving cage bar. The grooves cooperate with steel connecting rod heads of a metal spiral conveyor belt. Although not every rod head becomes engaged in a cage bar groove, due to phase shifting in the spacings involved, some of the rod heads do become engaged. The rod head and groove arrangement is supposed to provide some driving assistance and establish less slippage of the spiral conveyor belt against the driving cage, which moves circumferentially faster than the belt in "overdriving" relationship.

The Roinestad patents disclose another type of "positive drive" for a spiral conveyor system. In the Roinestad patents, cage bar caps include linear vertical protrusions positioned to engage against protruding rod heads in a metal spiral conveyor belt. The vertical driving protrusions of the cage bar caps are intended to grip against the protruding belt rod heads and thus drive the belt, or a portion of the belt, at the same speed as the driving tower for a certain period or arc of movement. Since a spiral conveyor belt rises as it progresses, the rod heads in the Roinestad arrangement were to ride up on the cage bar protrusions until they were released at a vertical gap or interruption in the cage bar protrusion. This would release the rod heads and allow the rod and belt edges to spring back, then subsequently engage a second, different cage bar protrusion farther back than the first. In this way, the Roinestad "positive drive" arrangement was intended to intermittently drive groups of protruding rod heads at the same speed as the driving tower.

It is a principal purpose of the present invention to provide improved driving engagement between a spiral conveyor driving cage and a plastic conveyor belt, with structure which is relatively simple and advantageous over prior structures aimed toward the same purpose.

SUMMARY OF THE INVENTION

In accordance with the present invention a modular plastic conveyor belt includes side plates, either integral with a belt module or separate, assembled components, including at least one groove for driving assistance in engagement with a specially equipped driving cage bar.

In each side plate of the invention, one generally vertical groove is formed on a common center with a recessed, countersunk rod head bore. The groove is sized and positioned to be engaged by bumps or ridges formed in a driving cage bar cap, or by a vertical angle or bar edge, the width of which is less than that of the groove(s). Each cage bar cap may have, for example, one or two protrusions or ridges formed on the surface of the cap in position to engage with at least one groove of the side plate of the invention. As the belt progresses along the spiral conveyer incline, its side plates encounter the protrusions of the cage bar caps, and one of the cage bar protrusions generally will engage in a groove of a side plate, seating in the groove and assisting in providing positive driving engagement between the driving cage and the plastic belt. The positive driving engagement at each side plate is periodic, with the groove engaged by a cage bar only briefly due to the overdrive relationship between the driving cage and the belt.

In one embodiment, two or more of the generally vertical grooves may be provided in each outwardly extending face of a side plate, depending on the size of the side plate, i.e. the pitch of the conveyor belt. One of the driving engagement grooves is positioned over the rod bore, lying concentrically with the rod bore. An additional groove, of similar shape and depth, may be spaced from the rod bore and formed in the side plate structure, parallel to the first such groove.

In the driving of the spiral conveyor belt, not every groove of the side plates will be engaged by a bump of the driving cage bar cap. However, from side plate to side plate in the progressing spiral conveyor, the spacing between side plates (and thus between grooves of succeeding side plates) can vary slightly because of the inherent flexibility of the belt, which is mostly collapsed at the inside of its curving path. Thus, some cage bar bumps or ridges will not be engaged in side plate grooves at any particular instant, but a sufficient number are always properly seated to provide enhanced driving engagement between the driving cage and the belt, and thus to improve the driving of the belt through the spiral conveyor system. Each side plate groove is engaged by a ridge from time to time due to the overdrive of the driving cage relative to the belt.

In one embodiment of the invention, an improved side plate for use in a modular plastic spiral conveyor belt system includes a molded plastic body having forward and rearward legs generally parallel and offset from one another, the two legs being connected by a central angled portion such that the two legs and the central angled portion define the length of the side plate. One of the two legs is an outer leg for positioning at an edge of a modular plastic conveyor belt and has an outer surface which is adapted for engaging cage bars of a driving cage in the spiral conveyor system. The outer leg has a bore for receiving a connecting rod in an assembled modular conveyor belt and the bore includes a countersink bore toward the outer surface of the leg sized to receive a rod head of the connecting rod. A groove is formed generally vertically in the outer surface of the outer leg, transverse to the length of the side plate, with the groove lying over the countersink bore and being centered on the countersink bore. The groove in the side plate and in similar side plates in a series of such side plates in a spiral plastic conveyor belt may be engaged by protruding elements of a driving cage to assist in driving engagement between the driving cage and the spiral conveyor belt.

In specific embodiments the invention comprises a combination of the grooved side plate with a cage bar or cage bar cap having a plurality of bumps, protrusions or ridges which are positioned to engage with and seat in the side plate grooves.

It is therefore among the objects of the present invention to enhance the driving relationship between a driving cage and side plates of a plastic modular conveyor belt, in a spiral conveyor belt system, and to make less critical the speed relationship between an overdriven cage and a belt. These and other objects, advantages and features of the invention will be apparent from the following description of preferred embodiments, considered along with the accompanying drawings.

DESCRIPTION OF THE DRAWINGS

FIG. 1 is a perspective view showing a side plate according to the principles of the invention, having a groove formed in an outer surface of the side plate on a common center with a rod bore.

FIG. 2 is a perspective view similar to FIG. 1 but showing a side plate for a conveyor belt of larger pitch, with the outer surface of the side plate having two grooves.

FIG. 3 is a plan view in section, showing a side plate of a conveyor belt being engaged by a cage bar, with the cage bar having a cap with groove-engaging bumps in its outer surface.

FIG. 4 is a plan view showing a modified embodiment wherein the side plate is formed integrally with a plastic module of the conveyor belt.

FIG. 5 is another view similar to FIG. 3, showing angled cage bars with edges providing protrusions, for engagement with the side plate grooves.

FIG. 6 is a perspective view showing one example of a cage bar cap which may form a part of the invention.

DESCRIPTION OF PREFERRED EMBODIMENTS

In the drawings, FIG. 1 shows a side plate 10 formed according to the principles of the present invention. The plastic side plate 10 is adapted for inclusion as a side member in a modular plastic conveyor belt, particularly such a belt as used in a spiral conveyor belt system. The side plate 10 as conventionally used on a spiral conveyor belt system provides a surface 12 for engagement against the driving cage bars of the driving cage or driving tower. In U.S. Pat. No. 4,901,844, for example, these side plates were disclosed as having recesses or countersink bores for receiving the plastic rod heads of the modular conveyor belt, in order to prevent excessive wear on the rod heads in the spiral system.

In the present invention, as shown in FIG. 1, the rod bore 14 of the side plate 10 also has a countersink or recess 16. This is formed in the outer cage-engaging surface 12, which is on an outer leg 18 of the side plate as shown. A second leg 20 is inwardly offset and has a slot 22 which provides for expansion and collapse of the plastic conveyor belt in straight and curving paths. A central angled portion 24 of the side plate 10 connects the two offset legs 18 and 20 together.

In the side plate and system of the present invention, a groove or slot 26 is formed generally vertically in the driving engagement face 12 of the side plate, i.e. generally transverse to the length of the side plate. As indicated, the groove 26 preferably is formed on a common center with the rod bore and countersink 16. Preferably the groove is rounded as illustrated, for smooth entry and exit of a cap bar protrusion.

It should be understood that one or more additional grooves or slots 26, similar to the groove 26 shown, can be provided in the outer surface 12 of the side plate 10. Such additional groove would be spaced from and parallel to the groove 26, although not formed at the location of any bore or countersink.

FIG. 2 shows another side plate 30 in accordance with the principles of invention. The side plate 30, which may be of a longer length or pitch than the side plate 10 of FIG. 1, is shown with a groove or slot 32 similar to that of the side plate 10, that is, the groove 32 is formed on a common center with a rod bore 34 and countersink or recess 36. However, FIG. 2 also shows an additional groove or slot 38, similar in shape, spaced from and parallel to the groove 32. This groove 38, as mentioned above, is not formed at the location of any bore or countersink.

FIG. 3 is a sectional plan view, showing a series of side plates 10 of the type shown in FIG. 1. The side plates 10 are part of a modular plastic conveyor belt, the remainder of the belt not being shown in FIG. 3. The side plates 10 are at the inside of a curve of the conveyor belt, i.e. that side of the belt which engages against the driving tower or cage as the conveyor progresses in a curving and spiral path around the driving tower.

In FIG. 3 a driving cage bar is shown generally identified by the reference number 40. The cage bar 40 has one or more bumps or protrusions or ridges 42, which may advantageously be formed in a cage bar cap 44 which is fitted over and secured to a metal cage bar 46 inside. As indicated, the protrusions 42 of the cage bars engage in the generally vertical grooves 26 of the side plates 10, which may be rounded as shown. Generally, the spacing between cage bars 40 is greater than the spacing between successive side plates 10 in the conveyor belt; thus, not every side plate 10 will be engaged by a driving cage bar at any given instant. Often even a pair of successive cage bars such as the cage bar 40 and the cage bar 40a shown in FIG. 3 will have bumps 42 that do not both engage side plate grooves simultaneously. However, a sufficient number of the bumps or ridges 42 will be engaged in side plate grooves at any given instant, that a significant driving engagement assistance results. Since the driving cage is used in an "overdrive" condition, wherein the driving cage rotates slightly faster than the movement of the spiral conveyor belt itself, the bumps 42 will engage in grooves 26 only momentarily, and will engage in different side plate grooves successively over time.

In FIG. 3 two grooves 26 and 48 are shown in each side plate. In this case, the cage bar cap 44 can have either one or two ridges or protrusions 42. If two are included they should be at the same spacing as the grooves 26 and 48.

The cage bar caps 44 may be produced from plastic, for optimum frictional engagement with minimum wear. However, other appropriate plastics may be used if desired.

FIG. 4 shows another embodiment of the invention, wherein integral side plates 50 of conveyor belt modules 52 are used and are each provided with at least one cage bar driving engagement groove 54. The module 52 with the integral side plate 50 may be as described in copending U.S. application Ser. No. 594,623, filed Oct. 9, 1990 and commonly owned with the present invention.

As indicated, the generally vertical grooves 54 on the integral side plates 50 are positioned across and concentrically with rod bores 56 and countersink recesses 58. The operation of the embodiment of FIG. 4 is similar to that described above.

FIG. 5 shows another spiral conveyor driving arrangement involving a belt with similar side plates 10 to those shown in FIG. 1, with a single groove 26 positioned concentrically with the rod bore. In this driving arrangement, the cage bars 60 of the driving cage are positioned angularly, such that a vertical edge 62 of each bar acts as a protruding ridge for engagement with the conveyor belt. The protruding edge 62 may be rounded or radiused for engagement in the side plate grooves 26 of the conveyor. The angling of the driving cage bars 60 eliminates the need for any cage bar capping having ridges or protrusions.

FIG. 6 shows a cage bar cap 44 in perspective, indicating that the protrusions 42 may be in the form of continuous vertical ridges, formed by extrusion of the cap 44.

It is therefore seen that the improved side plate construction and the system of the invention, including both the side plates and the cage bar caps, significantly improve the driving engagement between a driving cage and a modular plastic spiral conveyor belt. The engagement apparatus of the invention is used in an overdriving spiral system, and it makes less critical the speed relationship between the overdriven cage and the belt. Overdrive is required, but the degree of overdrive is more flexible with the system of the invention.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A side plate for a modular plastic conveyor belt in a spiral conveyor, comprising,
    a molded plastic body having a pair of legs generally parallel and offset from one another, the two legs being connected by a central angled portion such that the two legs and the central angled portion define the length of the side plate,
    one of the two legs being an outer leg for positioning at an edge of a modular plastic conveyor belt and having an outer surface which is adapted for engaging cage bars of a driving cage in a spiral conveyor system, and
    the outer leg having a bore for receiving a connecting rod in an assembled modular conveyor belt and the bore including a countersink bore toward the outer surface of the leg sized to receive and recess a rod head of the connecting rod, and a groove formed generally vertically in the outer surface, transverse to the length of the side plate, with the groove extending across and being centered on the countersink bore,
    whereby the groove in the side plate and in similar side plates in a series of such side plates in a plastic conveyor belt may be engaged by protruding elements of a driving cage to assist in driving engagement between the driving cage and the spiral conveyor belt.

2. A side plate according to claim 1, including a second groove formed in said outer surface, also generally vertical but not centered across a bore.

3. A side plate according to claim 1, in combination with a modular plastic conveyor belt, a series of said side plates being assembled serially along an inner edge of the conveyor belt in a spiral conveyor belt system, and including a spiral ramp and a driving cage, with the belt positioned to progress along the spiral ramp, driven by cage bars of the driving cage with the outer surfaces of the side plates exposed at the inner side of the belt in its path of spiral travel, such that the vertical grooves are exposed to the cage bars, and including means providing protrusions on the cage bars, serving as said protruding elements, and positioned and dimensioned to engage in the grooves of the side plates to assist in driving the spiral conveyor belt along the driving cage in the spiral conveyor belt system.

4. A spiral conveyor belt system according to claim 3, wherein the means providing protrusions on the cage bars comprises cage bars of generally rectangular cross section being installed angularly in the driving cage such that a protruding vertical edge of each cage bar serves as a protruding element for engagement in the grooves of the side plates.

* * * * *